United States Patent [19]
Streiff

[11] Patent Number: 5,489,002
[45] Date of Patent: Feb. 6, 1996

[54] SOLAR POWERED TWO WHEELED VEHICLE WITH ENERGY INTENSIFYING SOLAR COLLECTOR

[76] Inventor: Glenn C. Streiff, 25052 Campo Rojo, Lake Forest, Calif. 92630

[21] Appl. No.: 320,247

[22] Filed: Oct. 11, 1994

[51] Int. Cl.⁶ ............................................. B62K 11/00
[52] U.S. Cl. ........................ 180/65.3; 180/220; 280/214
[58] Field of Search ........................... 180/2.2, 220, 219, 180/65.1, 65.2, 65.3, 65.4, 65.8, 242, 243; 280/210, 212, 214, 215

[56] References Cited

U.S. PATENT DOCUMENTS

| | | | |
|---|---|---|---|
| 3,621,930 | 11/1971 | Dutchak | 180/65.3 |
| 4,423,368 | 12/1983 | Bussiere | 180/2.2 X |
| 4,516,647 | 5/1985 | Novak | 180/2.2 |
| 4,871,042 | 10/1989 | Hsu et al. | 180/220 |
| 5,316,101 | 5/1994 | Gannon | 180/220 X |

*Primary Examiner*—Kevin T. Hurley
*Attorney, Agent, or Firm*—Roy A. Ekstrand

[57] ABSTRACT

A solar powered two wheeled vehicle having energy intensifying solar collectors includes a two wheeled moped type vehicle supporting a motor generator and pedal driven crank operatively coupled to a rear drive wheel, The vehicle further includes a rear body portion defining a pair of forwardly open air ducts having wind driven generators supported therein. A pair of rechargeable batteries are further supported within the rear body portion and an array of solar energy converters are supported by a vertical panel support in a generally horizontal planar arrangement, The solar panel includes a lens for intensifying the solar energy applied to the solar cells within the panel array,

6 Claims, 2 Drawing Sheets

5,489,002

SOLAR POWERED TWO WHEELED VEHICLE WITH ENERGY INTENSIFYING SOLAR COLLECTOR

FIELD OF THE INVENTION

This invention relates generally to solar powered vehicles and particularly to the solar collectors used therein.

BACKGROUND OF THE INVENTION

Perhaps the most urgent need facing modern industrial nations throughout the world is the need for conservation and saving as well as efficient use of all forms of energy. The supply of consumable fuels such as hydrocarbon fuels and the like is vast but is unfortunately limited and will eventually be depleted. In addition, the large scale consumption of hydrocarbon fuels produces environmental effects which are potentially more dangerous than the exhaustion of the energy supplies themselves. The familiar problems of urban smog, acid rain and build up of carbon based gases within the atmosphere is well known. The greatest contributor to such environmental problems and excessive consumption of hydrocarbon fuels is found in the many types of vehicles used in the modern industrial world and elsewhere.

One of the most promising solutions to the problems created by hydrocarbon fuel consuming vehicles is that of electrically powered vehicles. Such electrically powered vehicles are virtually pollution free and utilize electrical energy which may be conveniently manufactured at localized sites or power plants in an energy efficient manner. One of the problems facing the development of such electrical vehicles is the limited capability of batteries and other cost effective apparatus to store sufficient energy to provide a practical long distance vehicle. Faced with the limited storage capabilities of batteries, practitioners in the art have endeavored to provide electric powered vehicles having some onboard capability to produce or replenish electrical energy and thereby extend the vehicle operative range. Such attempted solutions have included utilizing fuel cells which while effective are extremely expensive as well as solar electrical converters. Solar electric converters or solar panels as they are most typically called utilize various arrays of light energy responsive elements such as photovoltaic elements which convert light energy to electrical energy. Other energy saving approaches utilize a motor/generator drive system in which the kinetic energy of the vehicle during braking is used to drive the motor generator in a generator mode of operation thereby returning a portion of the kinetic energy of the vehicle to the electric power system during braking operation.

Despite the substantial efforts expended by practitioners in the art to produce electrically powered automobiles, the solution remains illusive due in large part to the substantial mass and aerodynamic size of the automobile itself. Automobiles suitable in size for use by commuters and the like generally weigh in excess of one thousand five hundred pounds placing a substantial burden upon the energy short electrical system of the vehicle.

Two wheeled vehicles have long provided a cost effective, fuel efficient alternative to full-size automobiles and have enjoyed great popularity in their gas powered forms throughout the world. Among the most efficient of such vehicles are small motorcycles and urban transportation vehicles known in the art as mopeds. Mopeds in particular are fuel efficient in that they require small amounts of power, are relatively lightweight and well suited to the urban environment. Unfortunately little, if any, effort has been expended by practitioners in the art in producing an efficient practical two wheeled urban vehicle operated using electrical power. One problem that is particularly daunting is the limited space available in such vehicles for supporting solar panels in an exposed position.

As a result, there arises a need in the art for an energy efficient effectively designed two wheeled electrically powered vehicle which is capable of operating for extended ranges in an urban environment.

SUMMARY OF THE INVENTION

Accordingly, it is a general object of the present invention to provide an improved solar powered vehicle. It is a more particular object of the present invention to provide an energy efficient effectively designed solar powered two wheeled vehicle. It is a still more particular object of the present invention to provide a solar powered electric two wheeled vehicle suited to the urban environment.

In accordance with the present invention, there is provided an electrically powered vehicle comprises: a frame having a plurality of wheels; a battery power supply; a motor/generator operatively coupled to at least one of the wheels; a user control electrically coupling the motor/generator to the battery power supply in either a motor or generator coupling; a pedal crank rotatable by a user operatively coupled to the at least one wheel; a body supported by the frame and defining a forwardly open air duct; an impeller and generator supported within the air duct electrically coupled to the battery power supply; a solar panel supported by the frame having an array of solar cells; and an energy intensifying lens supported upon the panel and operative to gather solar energy and concentrate it upon the solar cells.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
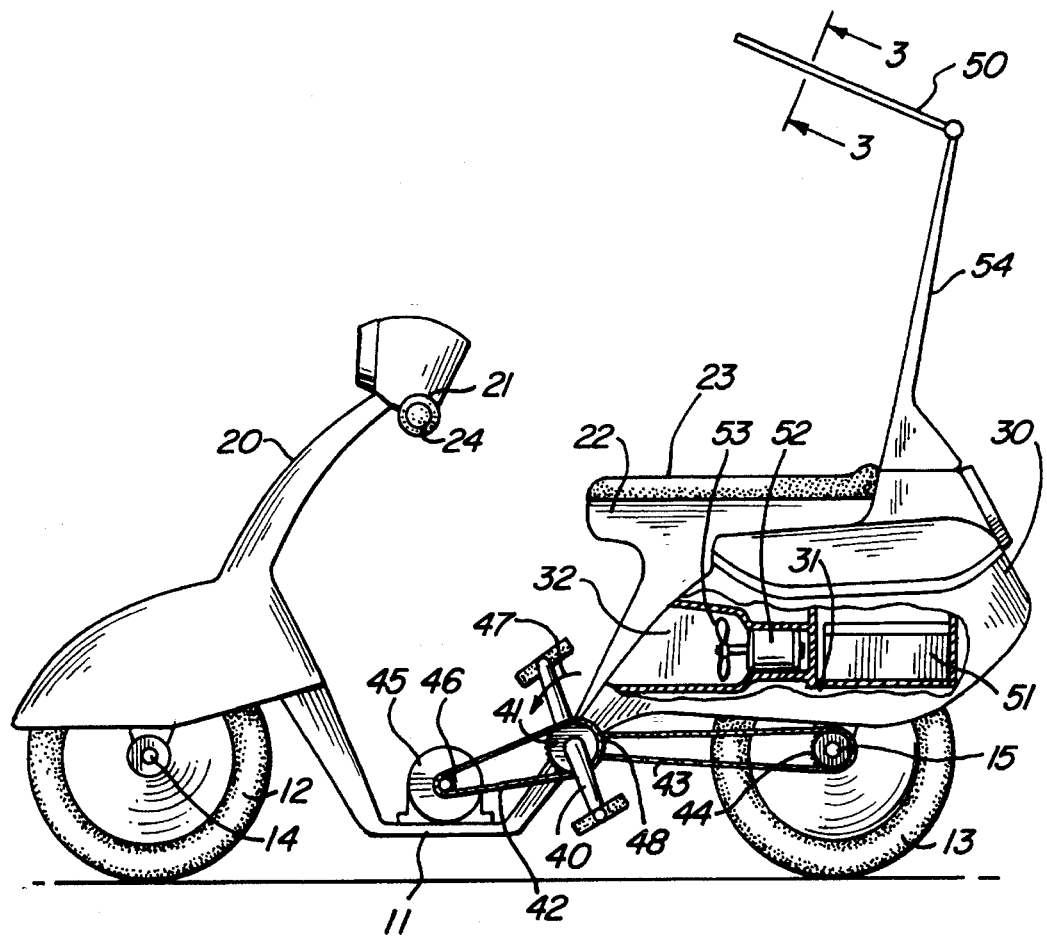
FIG. 1 sets forth a partially sectioned side view of a solar powered two wheeled vehicle constructed in accordance with the present invention.

FIG. 1 sets forth a solar powered two wheeled vehicle constructed in accordance with the present invention and generally referenced by numeral 10. Vehicle 10 is shown fabricated in general accordance with conventional moped vehicle fabrication and thus includes a support frame 11 having a front wheel 12 and a rear wheel 13. Frame 11 further includes a steering column 20 supporting a handlebar 21. In accordance with conventional fabrication techniques (not shown), steering column 20, front wheel 12, and handlebar 21 are pivotally coupled to frame 11 to facilitate the steering action of vehicle 10. In further accordance with conventional fabrication techniques, frame 11 further supports a seat support 22 having a seat 23 formed thereon.

Vehicle 10 further includes a somewhat bulbous rear body 30 fabricated of a material such as thin metal or plastic or fiberglass or the like. Rear body 30 extends beneath seat support 22 and rearwardly therefrom and defines an interior cavity 31. A battery 51 is supported within interior cavity 31. Rear body 30 further defines a forwardly open air duct 32 extending rearwardly into rear body 30. A generator 52 having a rotatable impeller 53 is supported within interior cavity 31 such that impeller 53 is positioned within air duct 32. While not seen in FIG. 1, vehicle 10 preferably includes a second generator and impeller combination supported on the opposite side of rear body 30 from that shown in FIG. 1 and a second air duct similar to air duct 32. In its preferred form, vehicle 10 further includes a second battery supported on the opposite side of rear body 30 in the manner shown for battery 51. It will be apparent to those skilled in the art that vehicle 10 may utilize either a single generator and impeller as well as a single battery or multiple impeller generator combinations and multiple batteries in practicing the present invention.

Rear body 30 further includes a vertically extending panel support 54 having a generally planar solar panel 50 supported at the upper portion thereof. Solar panel 50 is constructed in accordance with the present invention and is shown in greater detail in FIG. 3. However, suffice it to note here that solar panel 50 includes an array of upwardly facing solar energy converters of the type commonly known as photovoltaic cells or their equivalent. In further accordance with the present invention, solar panel 50 includes a plurality of energy intensifiers also seen in FIG. 3 in greater detail used to enhance the performance and output of solar panel 50.

Motor vehicle 10 further includes a rotatable pedal crank 40 rotatably secured to frame 11 in accordance with conventional fabrication techniques. Pedal crank 40 further includes a clutch sprocket assembly 41 having a conventional single direction clutch mechanism and a plurality of external sprocket teeth. A motor/generator 45 constructed in accordance with conventional fabrication techniques is secured to frame 11 and supports a rotatable sprocket 46. A chain 42 encircles sprocket 46 and clutch sprocket 41 to provide operative coupling therebetween. Wheel 13 further supports a sprocket 44 having a chain 43 coupled thereto. Chain 43 further encircles a gear 48 operatively coupled to pedal crank 40.

Figure 2:
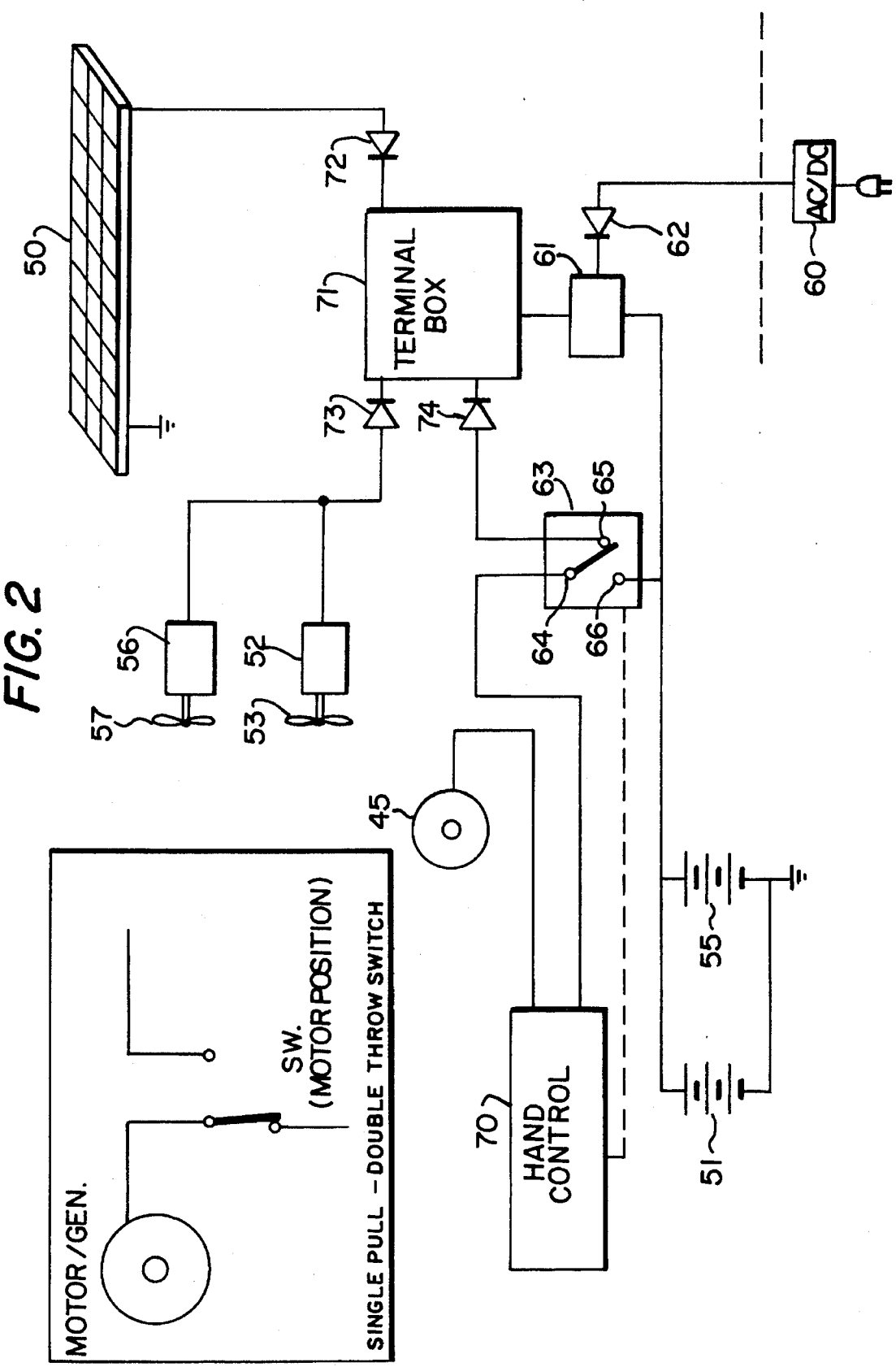
FIG. 2 sets forth a schematic diagram of the electrical powered system of the present invention solar powered two wheeled vehicle.

While not seen in FIG. 1, it will be understood by those skilled in the art that solar panel 50, battery 51, generator 52 and motor generator 45 are electrically coupled in accordance with the electrical circuit set forth in FIG. 2 by conventional wiring means not shown. In addition, a control 24 supported upon handlebar 21 is operatively coupled to motor generator 45 by conventional wiring techniques (not shown). Control 24 functions to activate motor generator 45 in accordance with the user's need for electrical power.

In operation, the user activates motor generator 45 using control 24 in the motor operational mode as seen in FIG. 2 causing motor generator 45 to produce operative power using the energy of battery 51 and rotating sprocket 46. The rotation of sprocket 46 provides rotational power applied to clutch sprocket 41 in the direction indicated by arrow 47. This rotation of clutch sprocket 41 is further coupled to chain 43 by gear 48 causing sprocket 44 to rotate which in turn rotates wheel 13 and propels vehicle 10 forwardly. In addition, the user may, if desired, save energy by applying a pedaling action to pedal crank 40 in the direction of arrow 47 which supplements the power provided by motor generator 45. This is particularly advantageous during times of acceleration following stopping or substantial slowing of vehicle 10. Once vehicle 10 achieves sufficient forward velocity, the user is able to cease pedaling pedal crank 40 and the energy required by motor generator 45 from battery 51 is relatively small and is sufficient to maintain the forward velocity of motor vehicle 10. In addition and in accordance with the present invention, a portion of the air passing over the surfaces of vehicle 10 is conducted into air duct 32 causing impeller 53 to rotate which in turn causes generator 52 to produce electrical energy. This electrical energy is supplied to battery 51 and supplements the energy of battery 51. In the event battery 51 is operating in a very low demand circumstance, generator 52 provides charging of battery 51. In the event battery 51 is operating in a relatively high demand situation, the current supplied by generator 52 supplements the current supplied by battery 51 preserving a portion of the energy stored therein. Concurrently, solar panel 50 when illuminated by sunlight or other light energy produces electrical energy which is further applied to battery 51 and which provides supplementary energy to battery 51. In addition, solar panel 50 operates continuously during periods of inactivity of vehicle 10 to provide a recharging of battery 51 during periods of nonuse. Thus, as vehicle 10 continues in the forward direction, energy is supplied from battery 51, generator 52 and solar panel 50 to meet the combined needs of the user. In addition, the user is able to supplement the required power by pedaling crank 40.

In the event vehicle 10 is slowed or stopped, the kinetic energy of the moving vehicle is converted by motor generator 45 to electrical power which is used to partially recharge battery 51. Thus, motor generator 45 switches to a generator operation during periods of deceleration or stopping thereby converting the vehicle's kinetic energy to electrical energy stored within battery 51.

In accordance with an important aspect of the present invention and as is set forth below in greater detail, solar panel 50 employs light energy intensifying lenses to couple additional energy to the energy converting units of solar panel 50 thereby enhancing the energy produced for a given solar panel area. This is particularly advantageous in a vehicle such as the moped configuration of vehicle 10 shown in FIG. 1 due to the otherwise limited surface areas provided by such vehicles.

FIG. 2 sets forth a schematic diagram of the electrical portion of the present invention solar powered vehicle. A pair of conventional rechargeable batteries 51 and 55 are coupled in a parallel arrangement to a voltage regulator 61. Regulator 61 is constructed in accordance with conventional fabrication techniques and operates to maintain the voltage applied to batteries 55 and 51 at a predetermined range of charging voltages. An AC to DC electrical converter fabricated in accordance with conventional fabrication techniques is coupled to one input of voltage regulator 61 by a conventional diode 62. A conventional motor generator 45 is coupled to a hand control 70 which in turn is coupled to input 64 of a control switch 63. Control switch 63 includes an output 65 and an output 66 coupled to the positive terminal of batteries 51 and 55. Output 65 of switch 63 is coupled through a diode 74 to a terminal box 71 which in turn provides connection to the remaining input of regulator 61. Terminal box 71 is constructed in accordance with conventional fabrication techniques and provides common coupling between the various devices coupled thereto. In its preferred form, hand control 70 and switch 63 are operatively associated as shown by the dashed-line extending therebetween. The object of hand control 70 and switch 63 is to provide the user with control operative through control 24 (seen in FIG. 1) by which motor generator 45 may be switched between a motor operation in which input 64 is coupled directly to batteries 51 and 55 by connection 66 or, alternatively, in a generator configuration as shown in FIG. 2 in which motor generator 45 is coupled to batteries 51 and 55 through diode 74 and regulator 61.

A pair of generators 52 and 56 having air driven impellers 53 and 57 respectively are coupled to the input of regulator 61 through diode 73 and terminal box 71. A solar panel 50 is also coupled to terminal box 71 through a diode 72.

In operation, the user actuates switch 63 to switch motor generator 45 between the motor configuration in which batteries 51 and 55 supply electrical energy directly to motor generator 45 through control 70 to drive motor generator 45 in the motor configuration and propel the vehicle. Alternatively, the user is able to switch control switch 63 to the generator position shown in FIG. 2 thereby operating motor generator 45 in the voltage generating position in which electrical energy is supplied through diode 74 to regulator 61. The energy provided by motor generator 45 in the generator position results from the braking action or so-called dynamic braking provided by imposing a load upon motor generator 45. The energy stored in the moving vehicle forms kinetic energy which drives motor generator 45 and provides electrical power which is coupled through diode 74 and regulator 61 to provide charging of batteries 51 and 55. Conversely, the conversion of kinetic energy of the moving vehicle to electrical energy causes motor generator 45 to provide a braking action upon the vehicle hence the term dynamic braking.

Hand control 70 provides a user control for exercising a variation of the current either applied to motor generator 45 in the motor configuration or to control the dynamic braking action when motor generator 45 is operated in the dynamic braking or generating configuration. Diode 74 isolates switch 63 from electrical energy applied to terminal box 71 from solar panel 50 or generators 52 and 56 as well as energy applied during charging by AC to DC converter 60. Diode 62 performs a similar isolating function prohibiting current from flowing from regulator 61 into AC to DC converter 60.

Solar panel 50 provides electrical energy when illuminated by solar light or other intense light sources to produce a current flow through diode 72 and terminal box 71 to the input of regulator 61. This current flow provides charging of batteries 51 and 55. Generators 52 and 56 provide electrical energy in response to air passing through impellers 53 and 57 which is similarly coupled to regulator 61 to charge batteries 51 and 55. Diodes 73 and 72 isolate generators 52 and 56 as well as solar panel 50 from reverse current applied to terminal box 71 from AC to DC converter 60 or motor generator 45 operating in the generating configuration.

Thus, solar panel 50, wind driven generators 52 and 56, as well as motor generator 45 operating in the dynamic braking or generating configuration provide electrical energy which is coupled to batteries 51 and 55 by regulator 61 to provide recharging thereof. AC to DC converter 60 is utilized by coupling converter 60 to a conventional source of alternating current power during periods of nonuse to recharge batteries 51 and 55 through diode 62.

Figure 3:
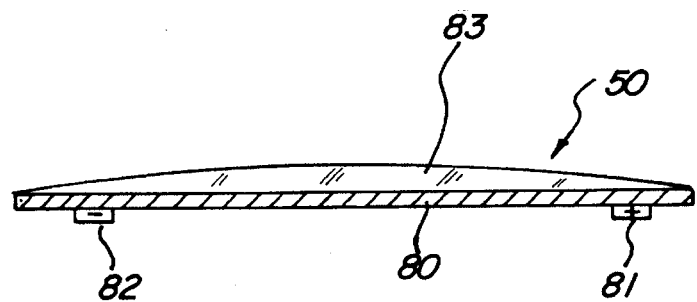
FIG. 3 sets forth a section view of the solar panel of the present invention solar powered two wheeled vehicle.

FIG. 3 sets forth a section view of the solar panel of the present invention taken along section lines 3—3 in FIG. 1. Solar panel 50 includes an array of solar cells 80 constructed in accordance with conventional fabrication techniques operatively coupled to a pair of output terminals 81 and 82 also in accordance with conventional fabrication techniques. In accordance with the present invention, an intensifying lens 83 is supported upon solar cells 80 and provides additional light energy gathering which is directed toward solar cells 80 to provide enhanced illumination thereof. Solar cells 80 respond to the enhanced illuminating energy coupled by lens 83 to produce a correspondingly higher output electrical energy at terminals 81 and 82. It will be apparent to those skilled in the art that lens 83 may be configured using a variety of lenses or lens combinations with the general objective of gathering an increased amount of solar energy and directing the increased solar energy to cells 80. Thus, for example, a conventional fresnel lens may be substituted for the lens shown in FIG. 3. Similarly, other equivalent lenses or multiple lenses may be utilized in place of lens 83 without departing from the spirit and scope of the present invention. The use of lens 83 in solar panel 50 provides energy intensification and is particularly advantageous in the fabrication of the present invention two wheeled vehicle due to the limited surface area available on such vehicles for solar cell support. Unlike automobiles which have substantial horizontal surfaces such as the hood, trunk or roof portions thereof to support a solar cell array, two wheeled vehicles of the type to which the present invention is most particularly directed provide limited available surface for solar cell support.

What has been shown is a solar powered two wheeled vehicle having energy intensifying solar collectors which provides a combined vehicle design to produce a low cost, energy efficient two wheeled vehicle particularly suited to urban environments. The vehicle utilizes a combination of solar power, dynamic braking, and wind driven electrical generators to minimize the electrical current required to move the vehicle and to provide charging of the vehicle battery system.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. An electrically powered vehicle comprising:

a frame having a plurality of wheels;

a battery power supply;

a motor/generator operatively coupled to at least one of said wheels;

a user control electrically coupling said motor/generator to said battery power supply in either a motor or generator coupling;

a pedal crank rotatable by a user operatively coupled to said at least one wheel;

a body supported by said frame and defining a forwardly open air duct;

an impeller and generator supported within said air duct electrically coupled to said battery power supply; a solar panel supported by said frame having an array of solar cells; and an energy intensifying lens supported upon said panel and operative to gather solar energy and concentrate it upon said solar cells.

2. An electrically powered vehicle as set forth in claim 1 wherein said plurality of wheels is a pair having a front wheel and a rear wheel.

3. An electrically powered vehicle as set forth in claim 2 wherein said at least one wheel is said rear wheel.

4. An electrically powered vehicle as set forth in claim 3 wherein said frame includes a seat support and a vertically extending solar panel support and wherein said solar panel is secured to said solar panel support.

5. An electrically powered vehicle as set forth in claim 4 wherein vehicle is a moped having said seat support positioned between said wheels and wherein said solar panel is supported in a generally horizontal orientation.

6. An electrically powered vehicle as set forth in claim 5 wherein said solar panel extends above said seat support.

* * * * *